Oct. 16, 1923.
W. E. KARNS
1,470,848
PROCESS OF PRODUCING GAS
Filed March 3, 1919
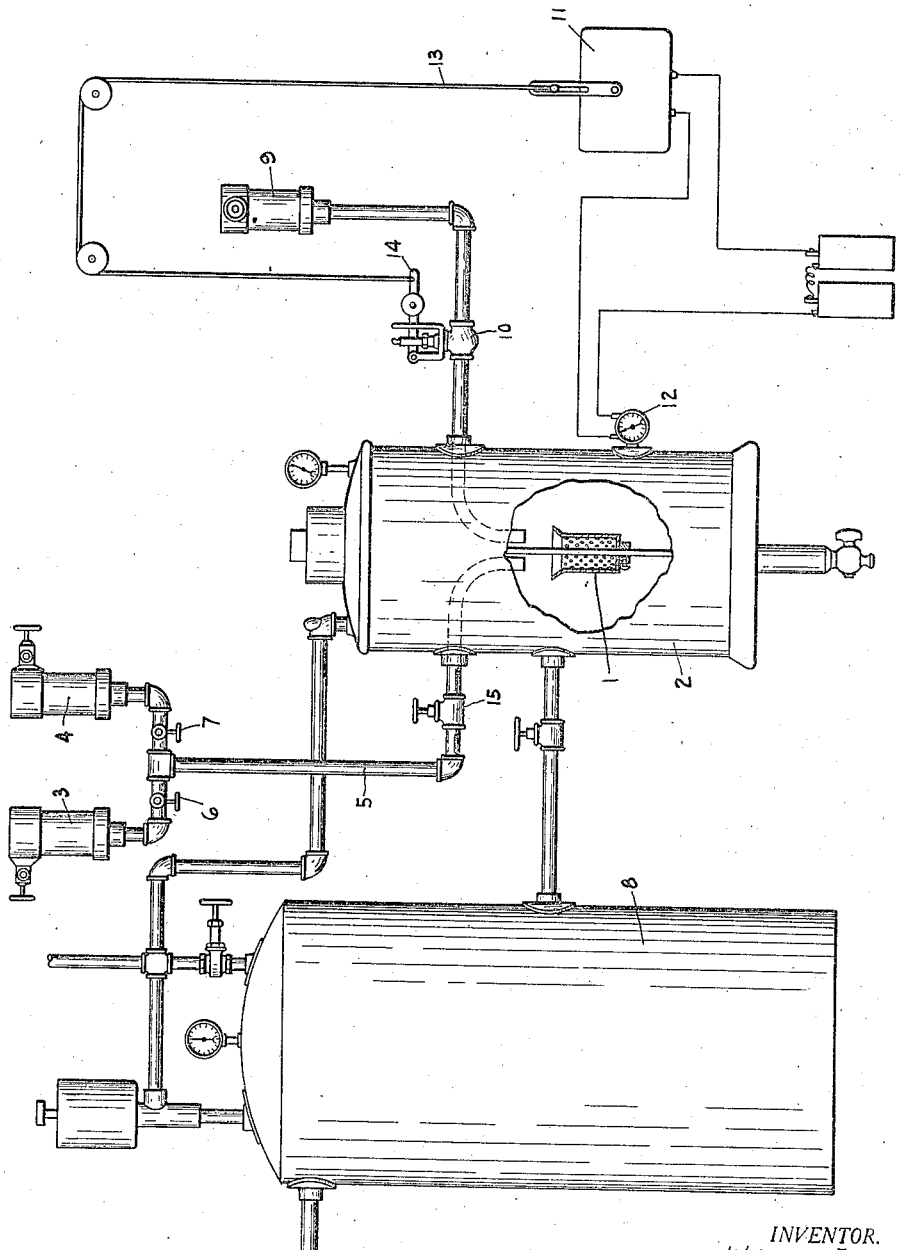
INVENTOR.
WALTER E. KARNS.
BY
ATTORNEYS Patented Oct. 16, 1923.

1,470,848

UNITED STATES PATENT OFFICE.

WALTER E. KARNS, OF CINCINNATI, OHIO, ASSIGNOR OF ONE-EIGHTH TO M. A. WALLACE, OF INDIANAPOLIS, INDIANA.

PROCESS OF PRODUCING GAS.

Application filed March 3, 1919. Serial No. 280,392.

*To all whom it may concern:*

Be it known that I, WALTER E. KARNS, a citizen of the United States, residing at Cincinnati, in the county of Hamilton and State of Ohio, have invented certain new and useful Improvements in Processes of Producing Gas, of which the following is a specification.

My invention relates to fuel-gas production, and its object is more practically to utilize calcium carbide or other carbide as a source of such gas, as will hereinafter be more fully described.

The single feature of the drawing is a diagrammatic elevation of apparatus suitable for performing the process, represented as with part of the exterior of the mixing chamber broken away to reveal the interior construction and operation. This apparatus is similar to that disclosed and claimed in my co-pending application, Serial No. 280,000, filed March 1, 1919.

In carrying out this improved process, prescribed quantities of a carbide, such as calcium carbide, and salt that is effervescent when heated above ordinary temperature, such as sodium bicarbonate, are thoroughly commingled, and placed in a perforated container 1, located in a relatively large mixing chamber 2. The upper end of the container is preferably left open so that liquids may be introduced directly on the charge of carbide and sodium bicarbonate in the container.

An important step of the process is the progressive introduction of a mixture of water and volatile combustible liquid, such as denatured alcohol, into a mixture of carbide and sodium bicarbonate.

The water and volatile combustible liquid are placed in separate tanks 3 and 4 and are fed into the mixing chamber through a common pipe 5, and mixed while passing through this pipe 5; the proportion of each being regulated by the valves 6 and 7. The mixture from the pipe 5 is discharged directly into the container 1, for rapid gas generation; but should it be desired to slowly generate the gas, the container 1 is lowered along the central upright rod in the mixing chamber and the liquid mixture from the pipe 5, by deflecting the bent end part of this pipe, is discharged directly into the mixing chamber to one side of the container 1, so that, as the mixture slowly rises in the mixing chamber, the carbide and sodium bicarbonate will be slowly acted upon by the slowly rising mixture.

The preferred composition of the inside container charge is as follows:

Calcium carbide_____48 drams,
Sodium bicarbonate_____ 5 drams.

These proportions of the carbide and sodium bicarbonate salt are thoroughly commingled before being applied to use.

The preferred composition of the liquid mixture is as follows:

Denatured alcohol_____1 ounce,
Water _____5 ounces.

The sodium bicarbonate in the carbide will liberate carbon dioxide gas, which being inert, will cause pores to form through the sediment of the carbide, without liability of explosion from its increased pressure as is the case with the highly combustible acetylene gas. The liquid mixture percolates through these pores; these also constituting escape openings for the acetylene gas, to prevent pockets forming, which is a common difficulty in the production of carbide gases ordinarily. Where the openings are not formed, partial confinement of the gases in the accumulated sediment in the lower portion of the mixing chamber, with rise in pressure and consequent spontaneous heat generation, rapidly raises the temperature of the gas. But by forming the pores through the accumulation of sediment and permitting the percolation of the alcohol through the pores, to volatilize therein, and permitting the escape of the acetylene and alcohol vapor from the sediment, this objectionable feature is eliminated, so long as the liquid mixture is properly fed into the mixing chamber. The sodium bicarbonate and the alcohol also, by the expansion of alcohol vapor and carbon dioxide gas therein, prevent caking of the sediment in the lower portion of the mixing chamber and retain this sediment in coarse sandy crystalline or mobile state.

The close intermingling of the alcohol vapor with the momentarily confined acetylene and carbon-dioxide gases in the sediment interstices, and its participation with those gases in the momentary slight pressure rise incident to the liberation of all of them, results in a very thorough intermingling of the particles of the acetylene and alcohol vapor.

Upon complete liberation from the sediment, therefore, there is a thorough and practically homogeneous mixture of acetylene gas and alcohol vapor. The alcohol, by latent heat of vaporization, has materially reduced the initial sensible heat of the mixture.

Moreover, by initially using a salt that is effervescent when heated above ordinary temperature, such as sodium bicarbonate, rather than a basic salt, as sodium carbonate, the required relatively slight effervescent action is produced in the sediment under the spontaneous heat action of the carbide-and-water decomposition, and the basic residue is left in such a state as to attract any sulphuretting or phosphoretting impurities and thus minimize these impurities in the final mixture.

To guard against the possibility of the volatile combustible liquid failing to properly feed into the mixing chamber, which would result in the aforedescribed rapid increase in temperature in the gas, and which, if not detected in time, might, by spontaneous combustion and explosion, result in the destruction or injury of the mixing chamber and storage tank 8 attached thereto, an emergency tank 9 is provided in which is stored a quantity of a volatile combustible liquid miscible with water but inert to the carbide, as denatured alcohol, for example, which will discharge into the carbide within the container in sufficient volume to practically stop the generation of gas and instantly lower the temperature of the gas in the mixing chamber and tank connected thereto. The admission of the volatile combustible liquid from the tank 9 is controlled by a valve 10, and this valve is normally controlled through the medium of a thermostat 11 and heat-influenced gauge 12 which is electrically connected to the thermostat; a cable 13 extending from the thermostat to the lever 14 of the valve 10 so that when the thermostat is influenced, the valve 10 will be opened to admit liquid from the tank 9. If it is desired to suddenly stop the formation of gas, the water and volatile combustible liquid from the tanks 3 and 4 may be shut off from the container by closing the valve 15 in the pipe 5, and then manually opening the valve 10 to admit a quantity of the liquid from the tank 9. The excess volume of volatile combustible liquid from the tank 9 not only stops the formation of gas from the carbide, but preserves the same in its natural state until, when it is desired again to produce gas, it readily permits the water and volatile combustible liquid mixture to be again brought into contact with the carbide, since it is readily miscible with the water.

Variations of the proportions, or substitution of equivalent ingredients, with or without variation of proportions, as well as variations in the apparatus and mode of operation may occur in adapting the invention to different uses, or under different conditions, and therefore, while certain ingredients, proportions and modes of operation, and certain constructional details of the apparatus are deemed preferable in connection with my invention, and I have shown and described these rather specifically in elucidating its use, as is required, I do not wish to be understood as being limited to such precise showing and description, but having thus fully described my invention, what I claim as new and desire to secure by Letters Patent is:

1. The process of producing gas, comprising the mixture of water and alcohol with a mixture of carbide and sodium bicarbonate.

2. The process of producing gas, comprising the mixture, in substantially the following proportions, by weight, of: calcium carbide, 48 parts; sodium bicarbonate, 5 parts; alcohol, 8 parts; and water, 40 parts.

3. The process of producing gas, comprising the liberation of carbon-dioxide gas from sodium bicarbonate, along with the decomposition of water and carbide, in the mass of carbide, under the action of the heat of said decomposition.

In witness whereof, I have hereunto affixed my signature.

WALTER E. KARNS.